(12) United States Patent
Shin et al.

(10) Patent No.: US 7,556,418 B2
(45) Date of Patent: Jul. 7, 2009

(54) BACKLIGHT ASSEMBLY AND DISPLAY APPARATUS HAVING THE SAME

(75) Inventors: Jin-Soo Shin, Hwaseong-si (KR); Jeoung-Gwen Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 136 days.

(21) Appl. No.: 11/318,695

(22) Filed: Dec. 27, 2005

(65) Prior Publication Data

US 2006/0139962 A1 Jun. 29, 2006

(30) Foreign Application Priority Data

Dec. 27, 2004 (KR) ............ 10-2004-0113057

(51) Int. Cl.
*F21V 7/04* (2006.01)
*G02F 1/1333* (2006.01)

(52) U.S. Cl. ............ 362/633; 362/634; 349/58; 349/60

(58) Field of Classification Search ............ 362/632, 362/633, 634, 600, 602, 608, 609, 614; 349/58, 349/60, 65, 67, 70
See application file for complete search history.

(56) References Cited

U.S. PATENT DOCUMENTS

| | | | |
|---|---|---|---|
| 6,634,761 B2 * | 10/2003 | Ichikawa | 362/600 |
| 6,847,416 B2 * | 1/2005 | Lee et al. | 349/58 |
| 6,853,410 B2 * | 2/2005 | Matsuda et al. | 349/67 |
| 6,885,419 B2 * | 4/2005 | Ogawa | 349/113 |
| 6,974,242 B1 * | 12/2005 | Chu et al. | 362/633 |
| 2002/0030983 A1 * | 3/2002 | Chou | 362/31 |
| 2002/0167626 A1 * | 11/2002 | Matsuda et al. | 349/65 |
| 2003/0043314 A1 * | 3/2003 | Lee et al. | 349/65 |
| 2006/0098459 A1 * | 5/2006 | Kao et al. | 362/633 |

* cited by examiner

*Primary Examiner*—John A Ward
(74) *Attorney, Agent, or Firm*—Cantor Colburn LLP

(57) ABSTRACT

A backlight assembly includes a lamp assembly, a receiving container and a panel guiding frame. The lamp assembly includes a light source to generate light and a lamp cover to reflect the light. The receiving container includes a bottom and a sidewall. The sidewall includes a first sidewall portion facing the lamp cover and separated from the lamp cover by a first interval and a second sidewall portion separated from the lamp cover by a second interval narrower than the first interval. The panel guiding frame includes a first frame portion facing an end of the bottom and a second frame portion extended from the first frame portion along a side face of the second sidewall and having an opening corresponding to the first sidewall portion. Thus, the backlight assembly may have a reduced non-effective display area.

31 Claims, 15 Drawing Sheets

BACKLIGHT ASSEMBLY AND DISPLAY APPARATUS HAVING THE SAME

This application claims priority to Korean Patent Application No. 2004-113057 filed on Dec. 27, 2004, and all of the benefits occurring therefrom under 35 U.S.C. 119, the entire contents of which are hereby incorporated by reference.

BACKGROUND OF THE INVENTION

1. Field of the Invention

The present invention relates to a backlight assembly and a display apparatus having the same. More particularly, the present invention relates to a backlight assembly having a reduced size and a display apparatus having the backlight assembly.

2. Description of the Related Art

In general, a liquid crystal display apparatus displays an image by varying the optical and electrical properties of the liquid crystals. The liquid crystal properties that are widely used in the creation of an image are an anisotropic refractive index and an anisotropic dielectric constant.

The liquid crystal display apparatus includes two substrates facing each other, and each of the substrates includes an electrode to form an electric field therebetween. The liquid crystal display apparatus includes a liquid crystal layer disposed between the substrates. When the electric field is applied to a liquid crystal layer, an alignment of liquid crystal molecules of the liquid crystal layer is changed and a light transmittance of a light passing through the liquid crystal layer is also changed in accordance with the alignment of the liquid crystal molecules, thereby displaying an image on the liquid crystal display apparatus.

In order to display the image, the liquid crystal display apparatus includes a liquid crystal display panel and a backlight assembly. The liquid crystal display panel includes a pair of substrates, a pixel electrode, a common electrode and the liquid crystal display layer.

The backlight assembly generates a light and supplies the light to the liquid crystal display panel. The backlight assembly includes a receiving container that receives the liquid crystal display panel, a lamp that is received into the receiving container, an optical member that improves optical properties of the light from the lamp, a panel guiding member that guides the liquid crystal display panel to the receiving container and a chassis that fixes the liquid crystal display panel to the receiving container.

However, the receiving container, the panel guiding member and the chassis are stacked up on one another, which greatly enlarges a non-effective display area with respect to a total size of the liquid crystal display panel.

SUMMARY OF THE INVENTION

The present invention provides a backlight assembly capable of reducing a non-effective display area on which an image is not displayed.

The present invention also provides a display apparatus having the above backlight assembly.

In one aspect of the present invention, a backlight assembly includes a lamp assembly, a receiving container and a panel guiding frame. The lamp assembly includes a light source to generate light and a lamp cover to reflect the light. The receiving container includes a bottom on which the lamp cover is disposed and a sidewall. The sidewall includes a first sidewall portion facing the lamp cover and being separated from the lamp cover by a first interval and a second sidewall portion that is adjacent to the first sidewall portion and is separated from the lamp cover by a second interval that is narrower than the first interval. The panel guiding frame includes a first frame portion that is disposed on an upper face of the sidewall and faces an end of the bottom, and a second frame portion that is extended from the first frame portion along a side face of the second sidewall and has an opening corresponding to the first sidewall portion.

In another aspect of the present invention, a display apparatus includes a lamp assembly, a receiving container and a panel guiding frame. The lamp assembly includes a light source to generate light and a lamp cover to reflect the light. The receiving container includes a bottom to support the lamp cover and a sidewall. The sidewall includes first sidewall portions formed at a periphery of the bottom to guide the lamp cover and second sidewall portions formed at areas corresponding between the first sidewall portions. The second sidewall portions are misaligned with the first sidewall portions. The panel guiding frame includes a first frame portion facing the end of the bottom and a second frame portion extended from the first frame portion along the sidewall and having a first opening corresponding to the second sidewall portions. The display panel is disposed on the first frame portion to display an image using the light. The chassis secures the display panel to the receiving container.

According to the above, the sidewall of the backlight assembly is overlapped with the display panel guiding member while the backlight assembly is assembled, so that the size of the non-effective display area may be reduced.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Hereinafter, the present invention will be explained in detail with reference to the accompanying drawings.

Figure 1:
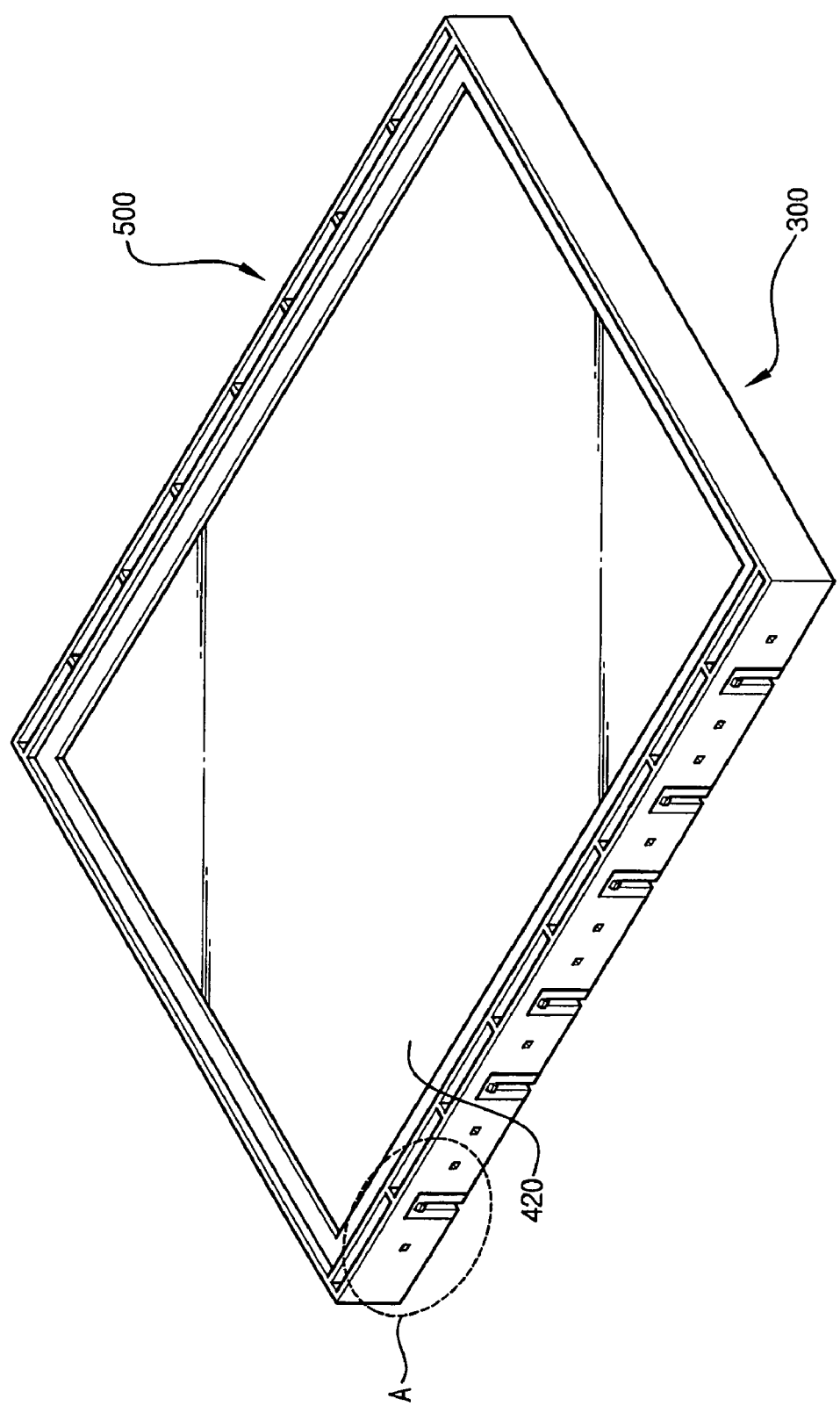
FIG. 1 is an exemplary perspective view showing a backlight assembly according to the present invention.
Figure 2:
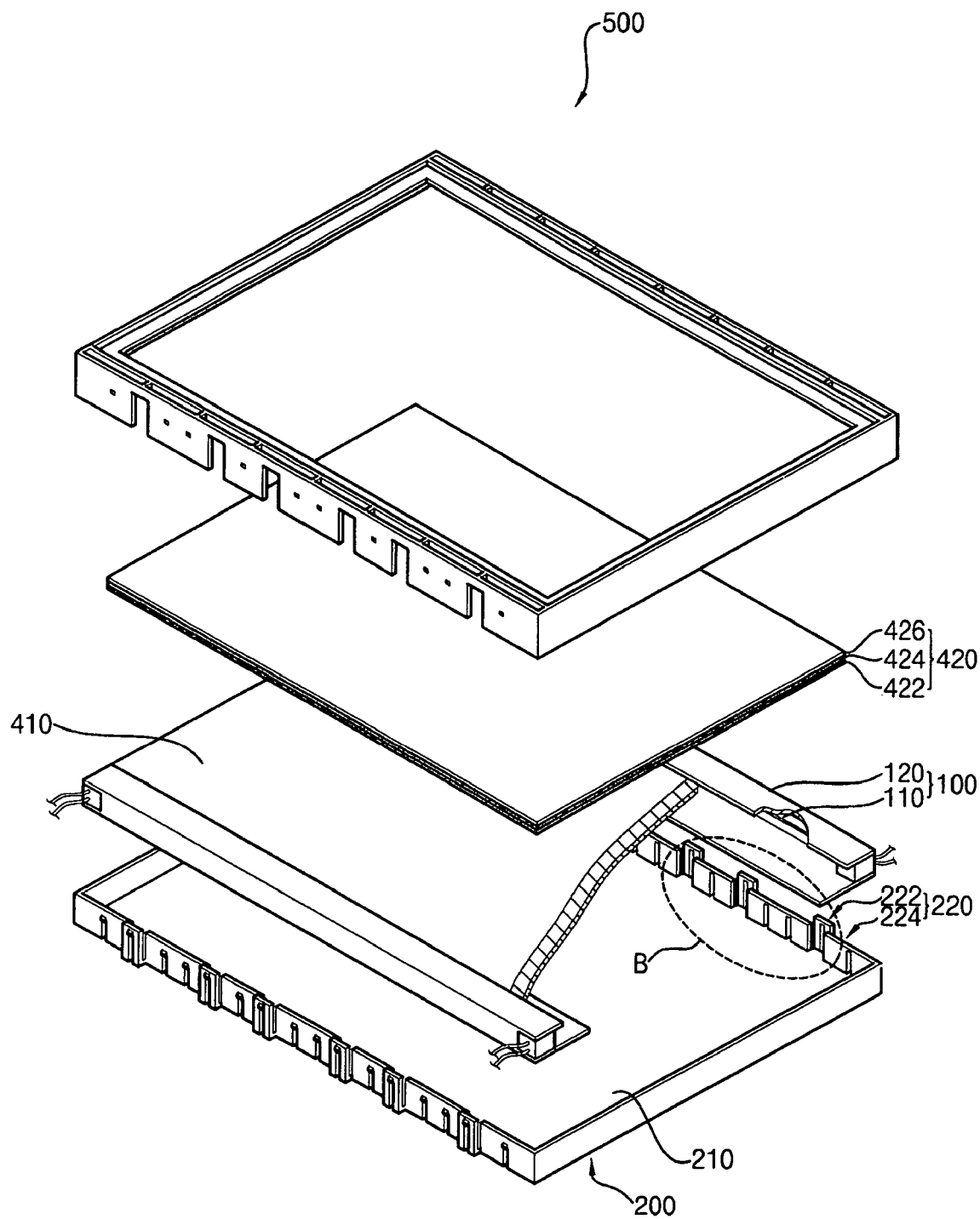
FIG. 2 is an exemplary exploded perspective view of the backlight assembly shown in FIG. 1.

FIG. 1 is a perspective view showing a backlight assembly according to an exemplary embodiment of the present invention. FIG. 2 is an exploded perspective view of the backlight assembly shown in FIG. 1.

Referring to FIGS. 1 and 2, a backlight assembly 500 includes a lamp assembly 100, a receiving container 200 and a panel guiding member 300. The backlight assembly 500 may further include a light guide plate 410 and an optical member 420.

Figure 3:
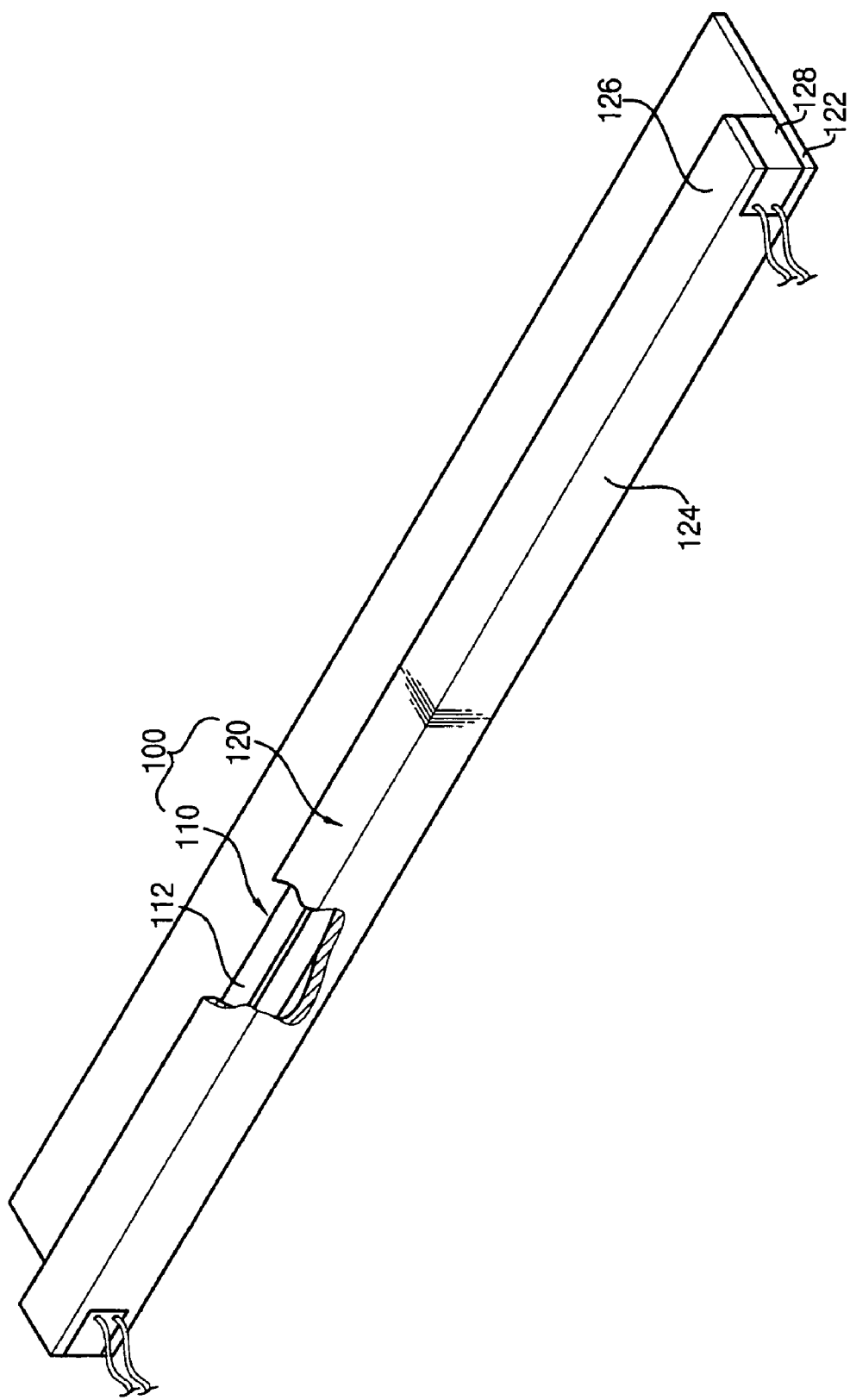
FIG. 3 is an exemplary perspective view of the lamp assembly shown in FIG. 2.

FIG. 3 is a perspective view of the lamp assembly shown in FIG. 2.

Referring to FIG. 3, the lamp assembly 100 includes a lamp 110 and a lamp cover 120. The lamp assembly 100 generates light to display an image.

The lamp 110 includes a lamp body 112 and a pair of electrodes (not shown). In the present embodiment, the lamp 110 may include a cold cathode fluorescent lamp CCFL.

The lamp body 112 may have various shapes, for example, such as a general bar-shape, a general U-shape, a general C-shape and so on. The lamp body 112 includes a discharge gas injected thereinto and a fluorescent layer formed therein. In the present embodiment, an example of the discharge gas may include mercury (Hg), argon (Ar), neon (Ne), xenon (Xe), krypton (Kr) or the like, and the fluorescent layer is formed on an inner face of the lamp body 112.

The electrodes may be formed either inside or outside the lamp body 112. Each of the electrodes receives a different discharge voltage generated from a power supply to one another. The discharge voltage applied to the electrodes has a voltage level difference that is sufficient to facilitate electron discharge.

The discharge gas injected into the lamp body 112 interacts with the discharged electron, to generate ultraviolet light in the lamp body 112. The ultraviolet lights are converted into visible light as it interacts with the fluorescent layer.

The lamp cover 120 reflects the visible light to improve the efficiency of the visible light.

The lamp cover 120 includes a first light reflecting face 122, a second light reflecting face 124 and a third light reflecting face 126.

In the present embodiment, the first, second and third reflecting faces 122, 124 and 126 have a rectangular plate-like shape. The first reflecting face 122 faces the second reflecting face 124, and the third reflecting face 126 connects the first reflecting face 122 with the second reflecting face 124.

The lamp assembly 100 may further include a lamp holder 128. The lamp holder 128 is placed inside the lamp cover 120, and the lamp 110 is fixed to the lamp cover 120 by means of the lamp holder 128.

The visible light from the lamp 110 is reflected from the first, second and third light reflecting faces 122, 124 and 126.

Figure 4:
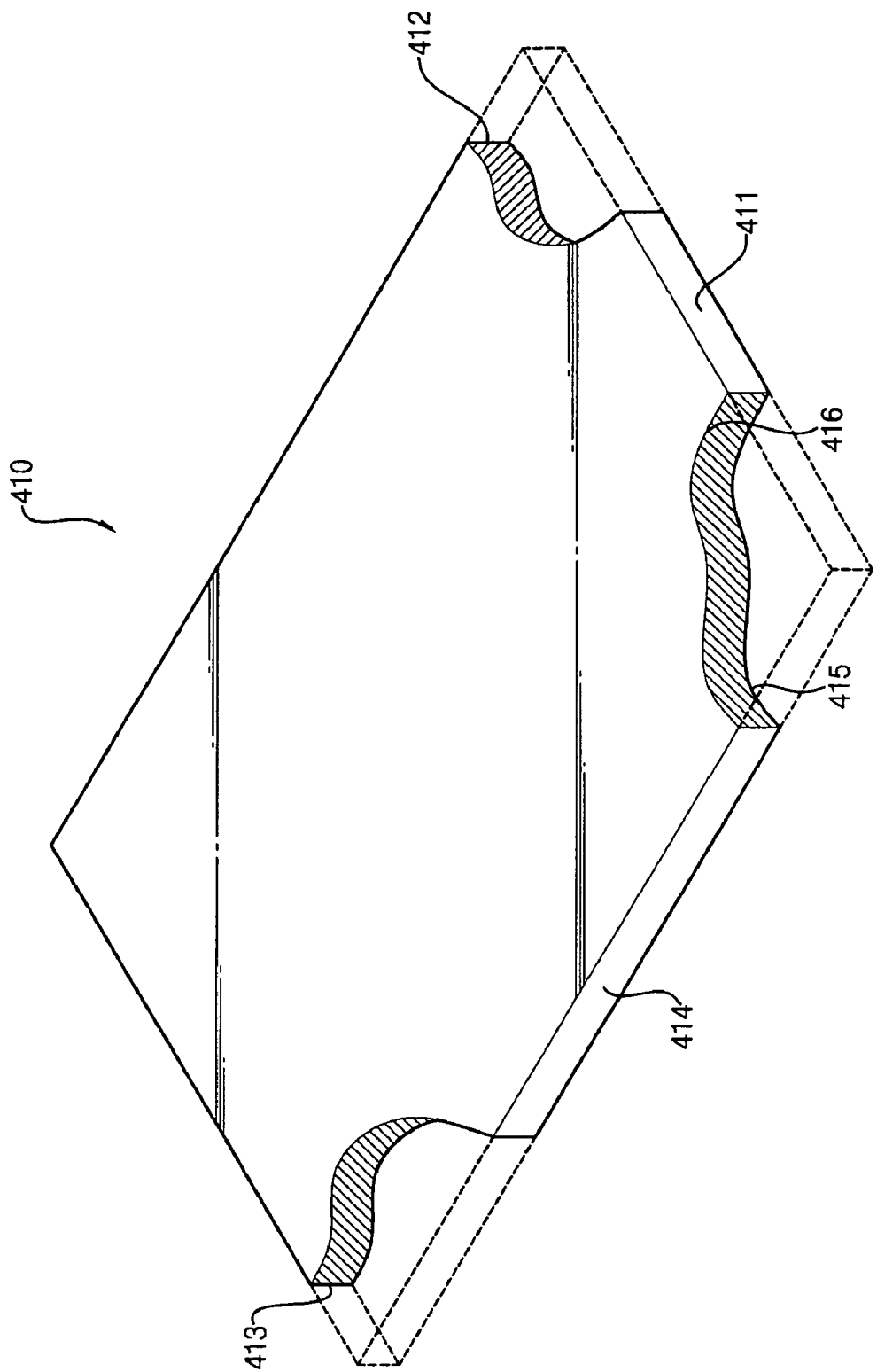
FIG. 4 is an exemplary perspective view of a light guide plate shown in FIG. 2.

FIG. 4 is a perspective view of a light guide plate shown in FIG. 2.

Referring to FIG. 4, the light guide plate 410 is combined with the lamp cover 120. The light guide plate 410 enhances the uniformity of brightness of the visible light from the lamp 110.

The light guide plate 410 has a plate-like shape, for example, a generally rectangular parallelopiped shape. The light guide plate 410 includes a light reflecting face 415, a light exiting face 416 facing the light reflecting face 415, four side faces 411, 412, 413 and 414 connecting the light reflecting face 415 and the light exiting face 416 with each other.

Particularly, the side faces 412 and 414 are defined as first side faces having a first area, respectively, and the side faces 411 and 413 are defined as second side faces having a second area that is smaller than the first area, respectively. The first side faces 412 and 414 face each other, and the second side faces 411 and 413 also face each other.

Referring to FIG. 2, the lamp assembly 100 is disposed adjacent to the first side faces 412 and/or 414, and the visible light from the lamp assembly 100 is incident into the light guide plate 410 through the first side faces 412 and 414. The incident visible light into the light guide plate 410 exits the light guide plate through the light exiting face 416.

Figure 5:
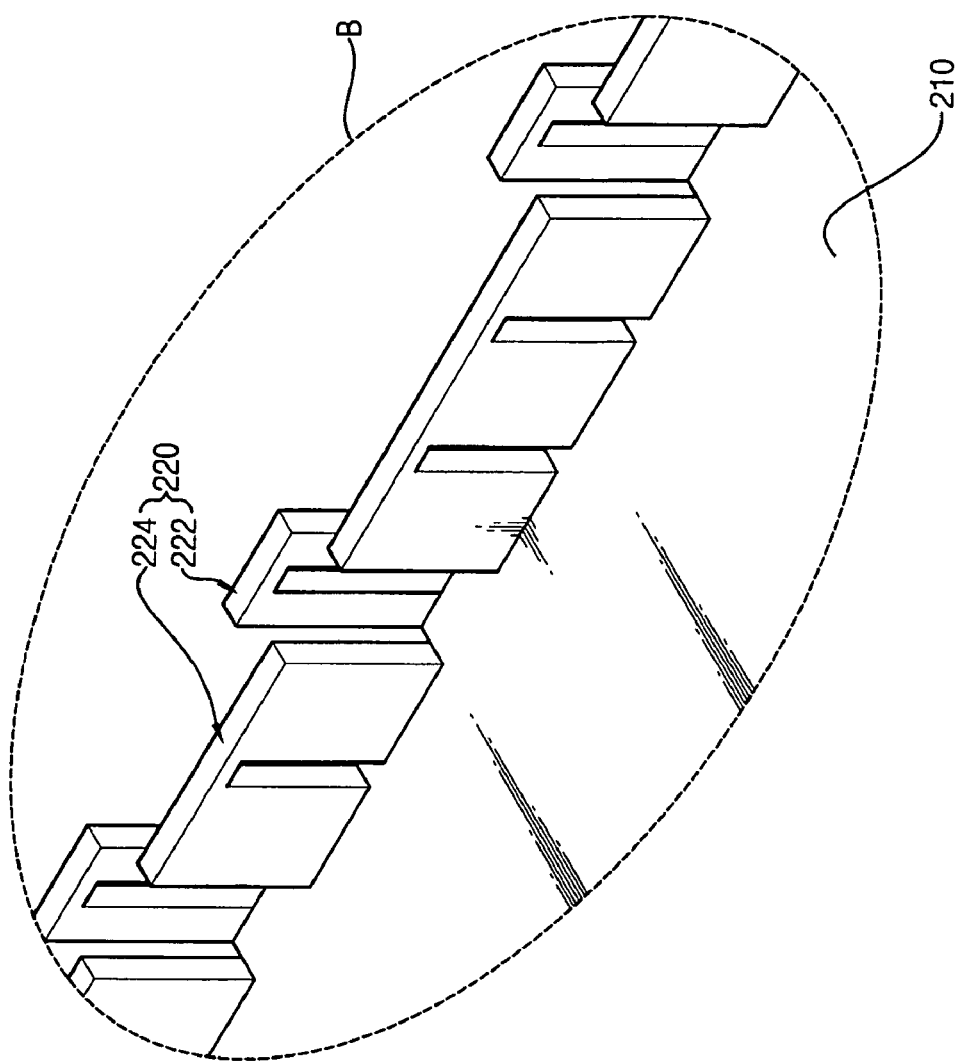
FIG. 5 is an exemplary enlarged perspective view of portion 'B' in FIG. 2.

FIG. 5 is an enlarged perspective view of portion 'B' in FIG. 2.

Referring to FIG. 5, the receiving container 200 includes a bottom 210 and a sidewall 220 to provide the receiving space.

Figure 6:
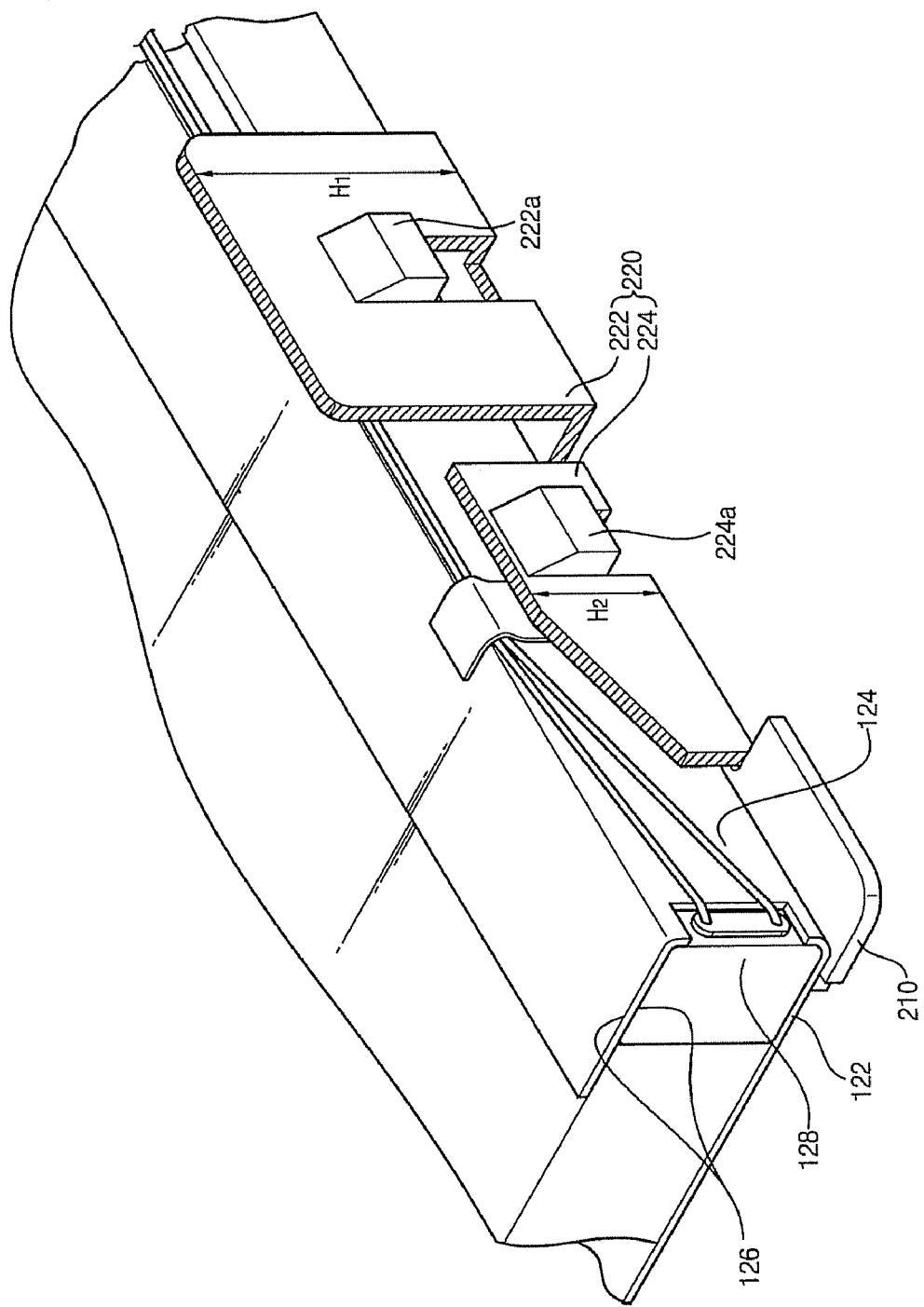
FIG. 6 is an exemplary perspective view showing a lamp assembly coupled to a receiving container in FIG. 1.
Figure 7:
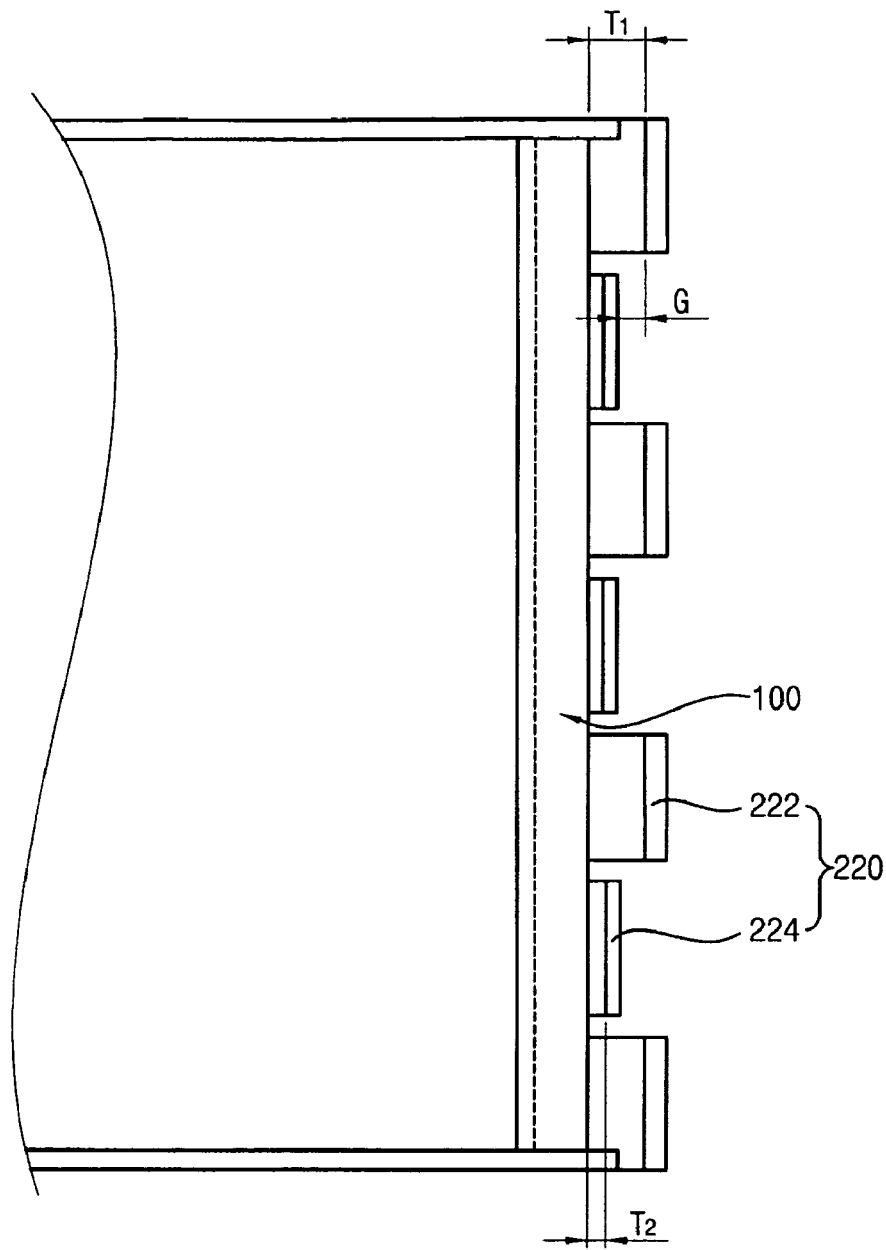
FIG. 7 is an exemplary plan view showing the backlight assembly in FIG. 2.

FIG. 6 is an exemplary perspective view showing a lamp assembly coupled to a receiving container in FIG. 1. FIG. 7 is an exemplary plan view showing the backlight assembly in FIG. 2.

Referring to FIGS. 3, 5 and 7, the lamp assembly 100 and the light guide plate 410 are disposed on the bottom 210 of the receiving container 200. The light guide plate 410 is disposed at a center portion of the bottom 210 of the receiving container 200, and the lamp assembly 100 is disposed between the light guide plate 410 and the sidewall 220 of the receiving container 200. Thus, an outer surface of the third light reflecting face 124 of the lamp cover 120 is adjacent to the sidewall 220 of the receiving container 200.

The sidewall 220 of the receiving container 200 is extended from the bottom 210 in a direction substantially perpendicular to the bottom 210.

The sidewall 220 includes a first sidewall 222 and a second sidewall 224.

The first sidewall 222 is substantially parallel to the third light reflecting face 124 of the lamp cover 100. The receiving container 200 includes at least two first sidewalls 222 formed at the periphery of the bottom 210.

The first sidewall 222 is separated from the second light reflecting face 124 by a predetermined first distance T1. As can be seen in the FIG. 6, in the present embodiment, the first sidewall 222 includes a first catching protrusion 222a that is partially protruded from the first sidewall 222. The first sidewall 222 has a first height H1. In another embodiment, the first sidewall 222 may include a recess in lieu of the first catching protrusion 222a.

In one embodiment, as may be seen in the FIGS. 5 and 7, the receiving container 200 may include at least two second sidewalls 224. The second sidewalls 224 are disposed between the first sidewalls 222, and are substantially parallel to the first sidewall 222. The second sidewalls 224 are separated from the second light reflecting face 124 of the lamp cover 100 by a predetermined second distance T2. The second sidewalls 224 may include a second catching protrusion 224a that is partially protruded the second sidewalls 224. The second sidewalls 224 have a second height H2 that is less than the first height H1 of the first sidewall 222. In another embodiment, the second sidewalls 224 may include a recess in lieu of the second catching protrusion 224a.

In the present embodiment, the first and second sidewalls 222 and 224 are misaligned with each other. In other words, the first sidewalls 222 are disposed at an imaginary plane that is non-coplanar with that of the second sidewalls 224. An interval G between the first and second sidewalls 222 and 224 is in a range from about 0.6 mm (millimeter) to about 5 mm in at least one direction that is substantially perpendicular to a longitudinal direction of the lamp cover 100. The interval G between the first and second sidewalls 222 and 224 is substantially equal to a thickness of a second frame portion of the panel guiding member 300.

Figure 8:
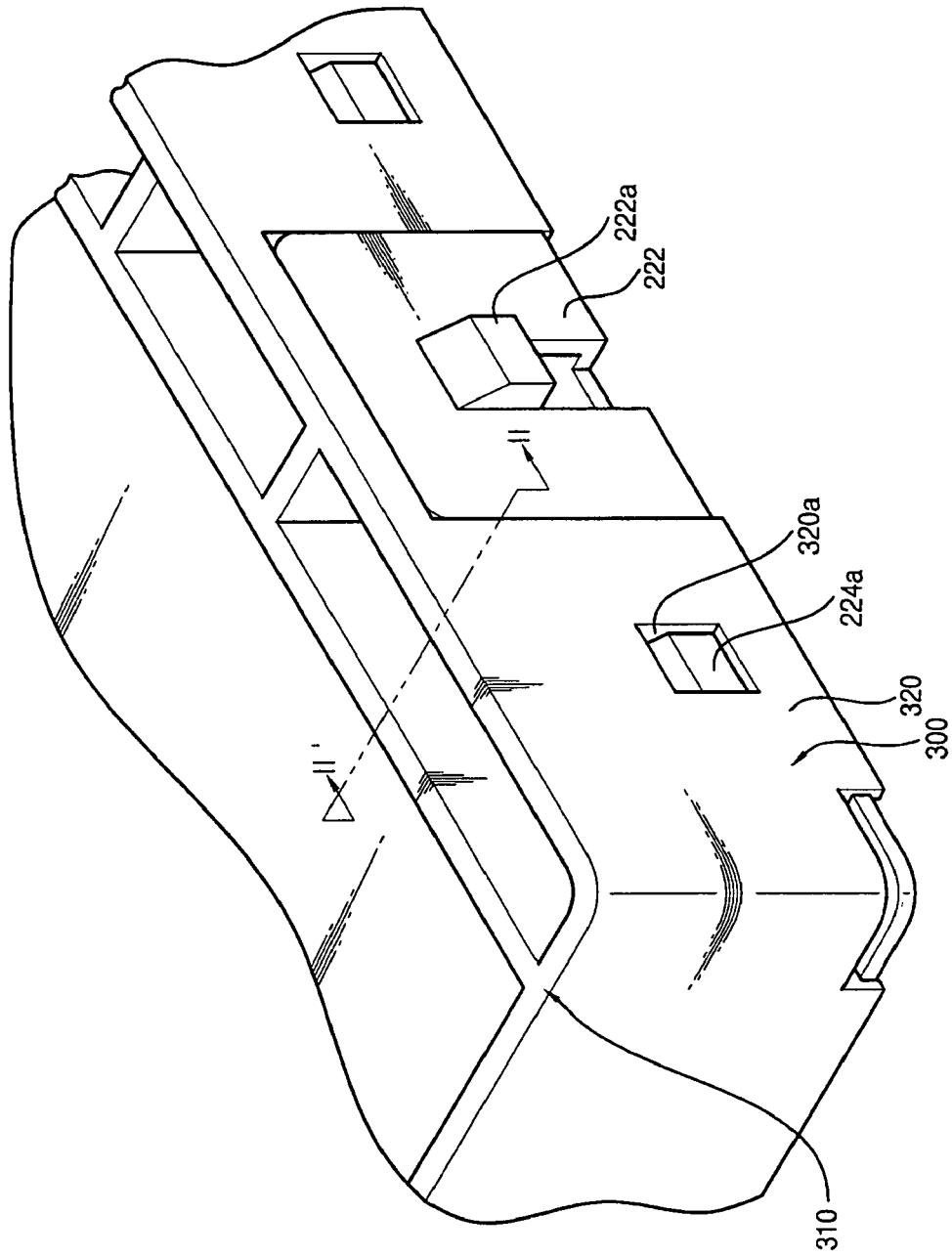
FIG. 8 is an exemplary enlarged perspective view of portion 'B' of the backlight assembly in FIG. 1.
Figure 9:
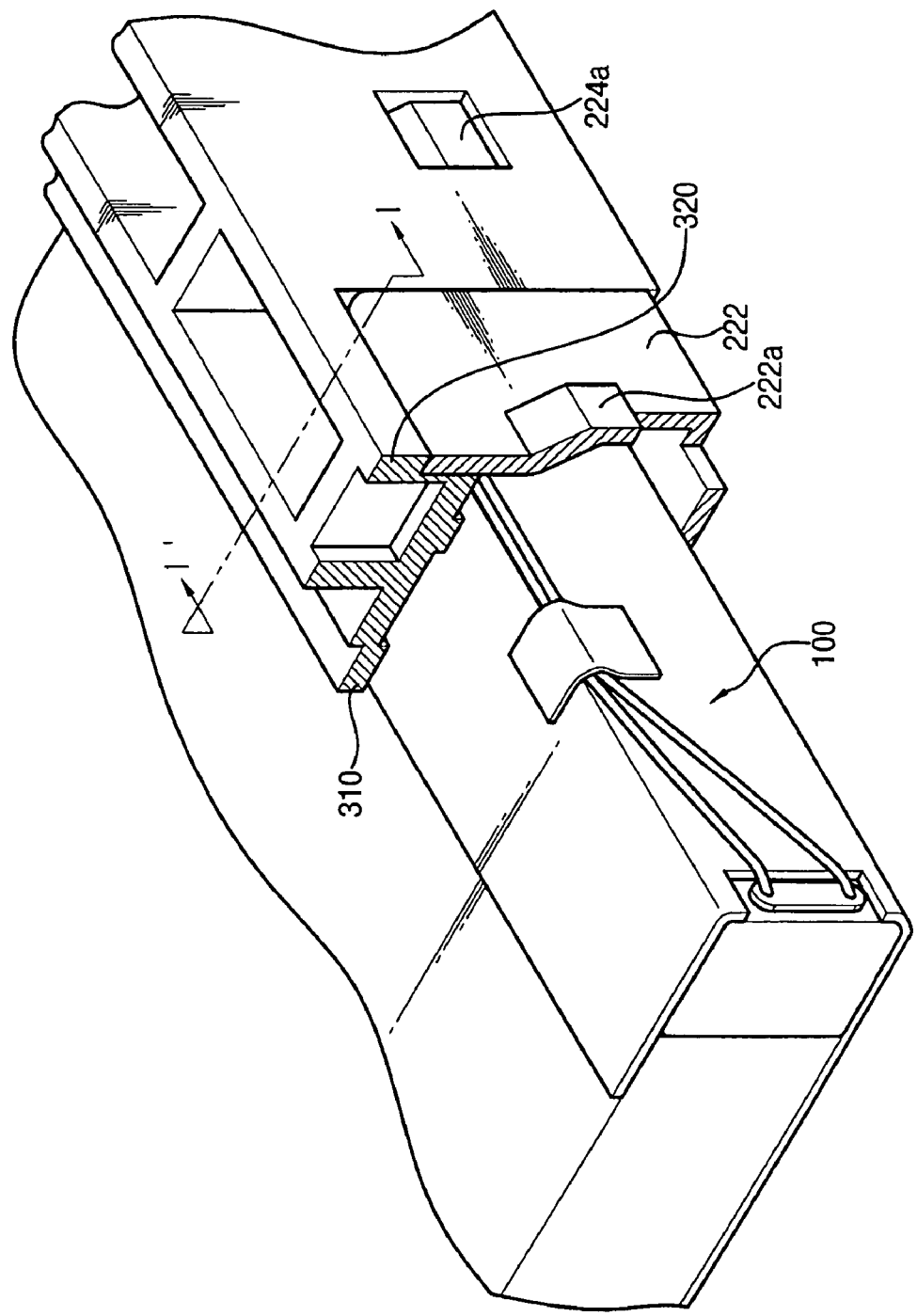
FIG. 9 is an exemplary partially cut perspective view showing the backlight assembly in FIG. 8.

FIG. 8 is an enlarged perspective view of portion 'B' of the backlight assembly in FIG. 1. FIG. 9 is a partially cut perspective view showing the backlight assembly in FIG. 8.

Referring to FIGS. 1, 8 and 9, the panel guiding member 300 is coupled to the receiving container 200. The panel guiding member 300 secures a display panel to the receiving container 200.

The panel guide member 300 includes a first frame portion 310 and a second frame portion 320.

Figure 10:
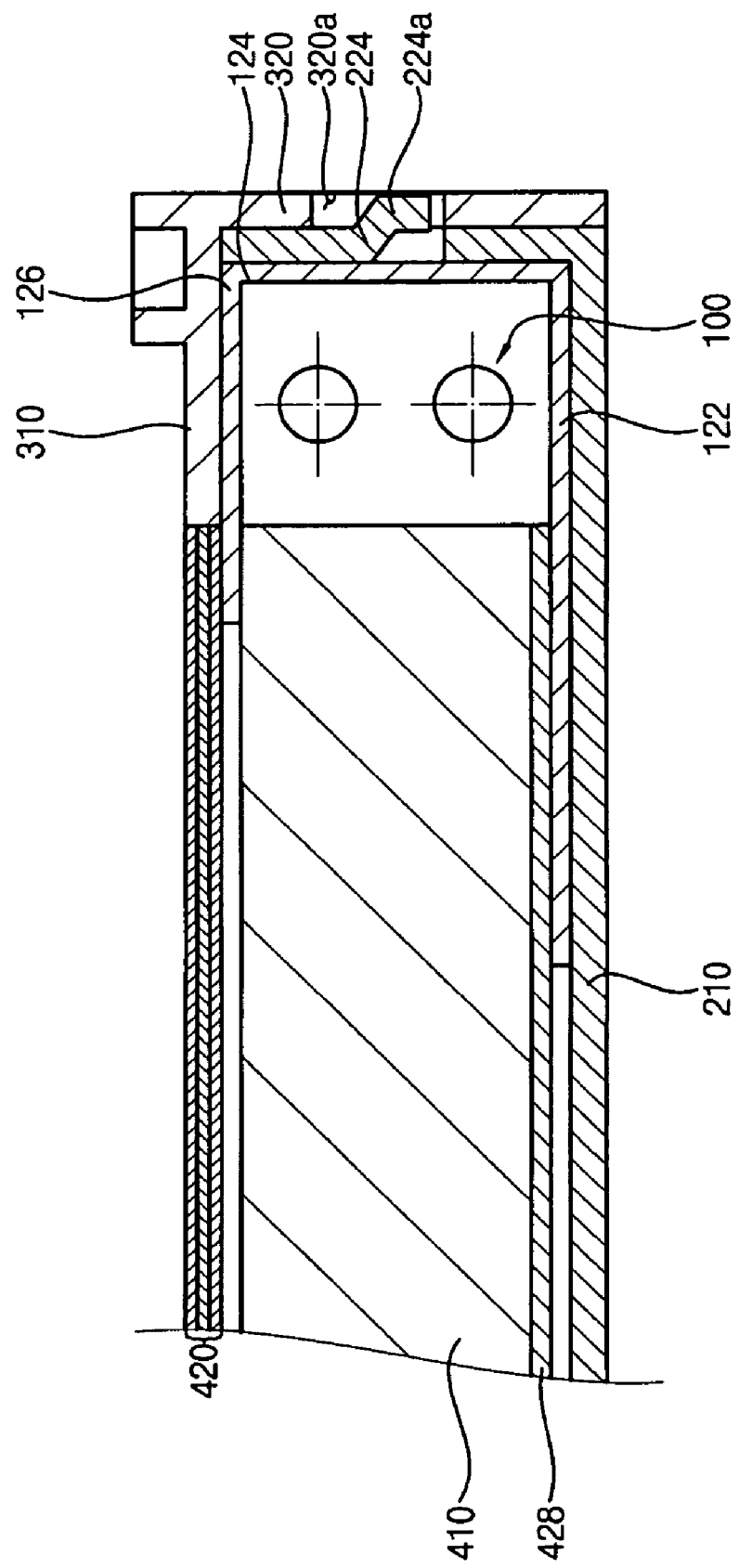
FIG. 10 is an exemplary cross-sectional view taken along line I-I' of the backlight assembly in FIG. 6.

FIG. 10 is a cross-sectional view taken along line I-I' of the backlight assembly in FIG. 9.

Referring to FIG. 10, the first frame portion 310 has a plate-like shape and faces the bottom 210 of the receiving container 200. The first frame portion 310 supports the display panel.

The second frame portion 320 also has a plate-like shape and is integrally formed with the first frame portion 310. The second frame portion 320 extends in a direction that is substantially perpendicular to the extension of the first frame portion 310. Thus, the second frame portion 320 is substantially parallel to the first and second sidewalls 222 and 224.

The second frame portion 320 is coupled to the second sidewall 224. In order to couple the second frame portion 320 to the second sidewall 224, the second frame portion 320 includes a catching recess 320a that corresponds to the second catching protrusion 224a. The catching recess 320a and the second catching protrusion 224a can be mechanically locked with each other. In one embodiment, the catching recess 320a may be formed through the second frame portion 320. In another embodiment, the catching recess 320a may be a protrusion in the event that the second sidewall 224 includes a catching recess in lieu of the second catching protrusion 224a.

Figure 11:
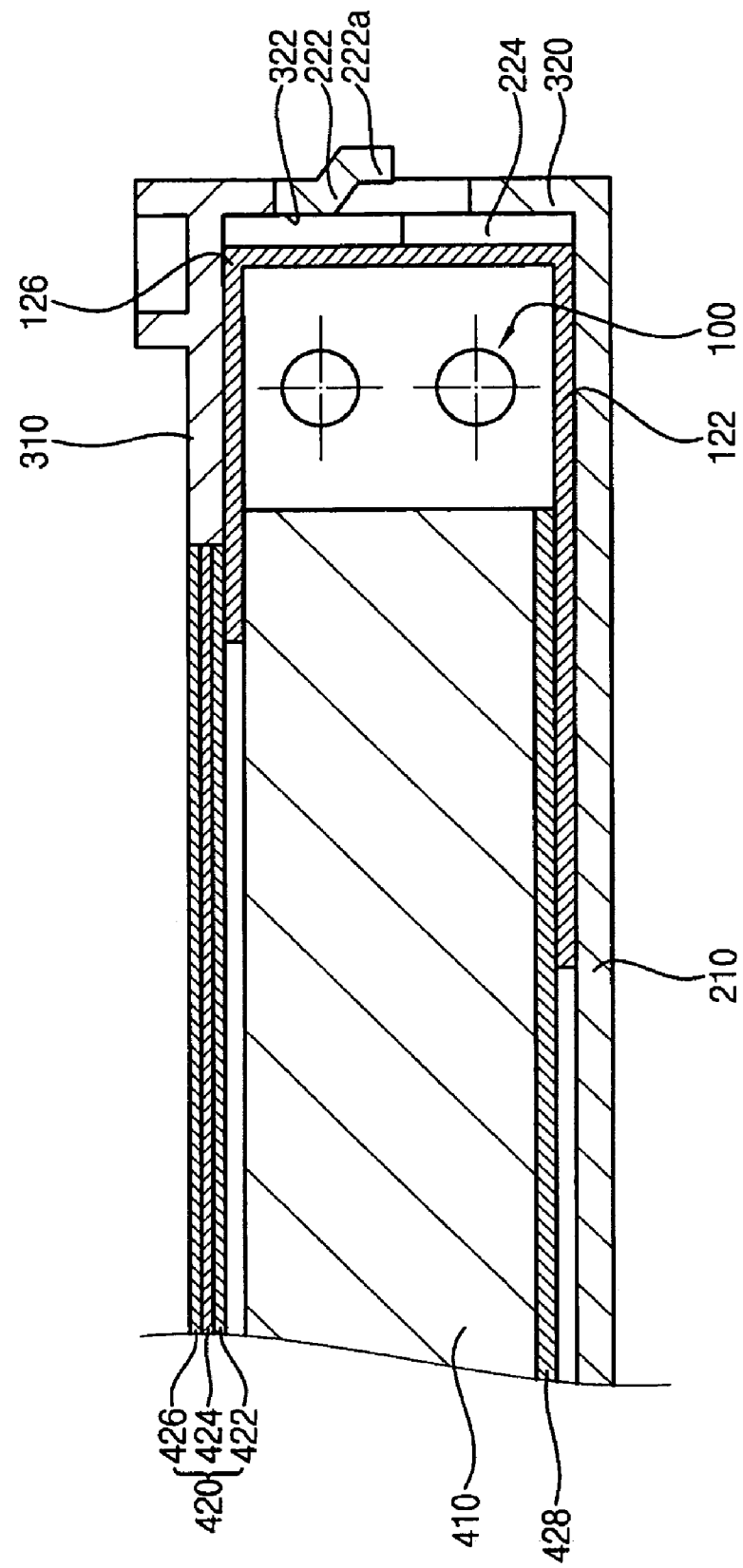
FIG. 11 is an exemplary cross-sectional view taken along line II-II' showing the backlight assembly in FIG. 8.

FIG. 11 is a cross-sectional view taken along line II-II' showing the backlight assembly in FIG. 8.

Referring to FIG. 11, the second frame portion 320 overlaps with the first sidewall 222. The second frame portion 320 has a thickness that is greater than that of the first sidewall 222. The second frame portion 320 is partially removed to form an opening 322 through which the first sidewall 222 is partially exposed. In order to make contact for a portion of the first sidewall 222 with the second frame portion 320, the second frame portion 320 includes a stepped portion formed therearound. In the present embodiment, the second frame 320 and the first sidewall 222 are formed on a substantially same level.

Referring to FIGS. 2 and 11, the backlight assembly 500 may further include the optical member 420. The optical member 420 may include a diffusing sheet 422, a prism sheet 424, a brightness enhancing film 426 and a reflecting plate 428.

The diffusing sheet 422 improves the uniformity of brightness of the light from the light exiting face 416 and enhances an angle between the light from the light guide plate 410 and the light reflecting face 415.

The prism sheet 424 is disposed on the diffusing sheet 422. The prism sheet 424 includes a prism pattern to collect the light diffused by the diffusion sheet 422. The prism sheet 424 changes the path of the light emerging from the diffusing sheet 422 in a direction that is substantially perpendicular to the light reflecting face 415. In the present embodiment, at least two prism sheets are disposed on the diffusing sheet 422, and the prism sheets have the prism pattern substantially perpendicular to each other.

The brightness enhancing film 426 is disposed on the prism sheet 424 to enhance the brightness of the light incident into the display panel.

The reflecting plate 428 is disposed between the bottom of the receiving container 200 and the light reflecting face 415 of the light guide plate 410 to reflect the light leaked through the light reflecting face 415 to the light guide plate 410.

Figure 12:
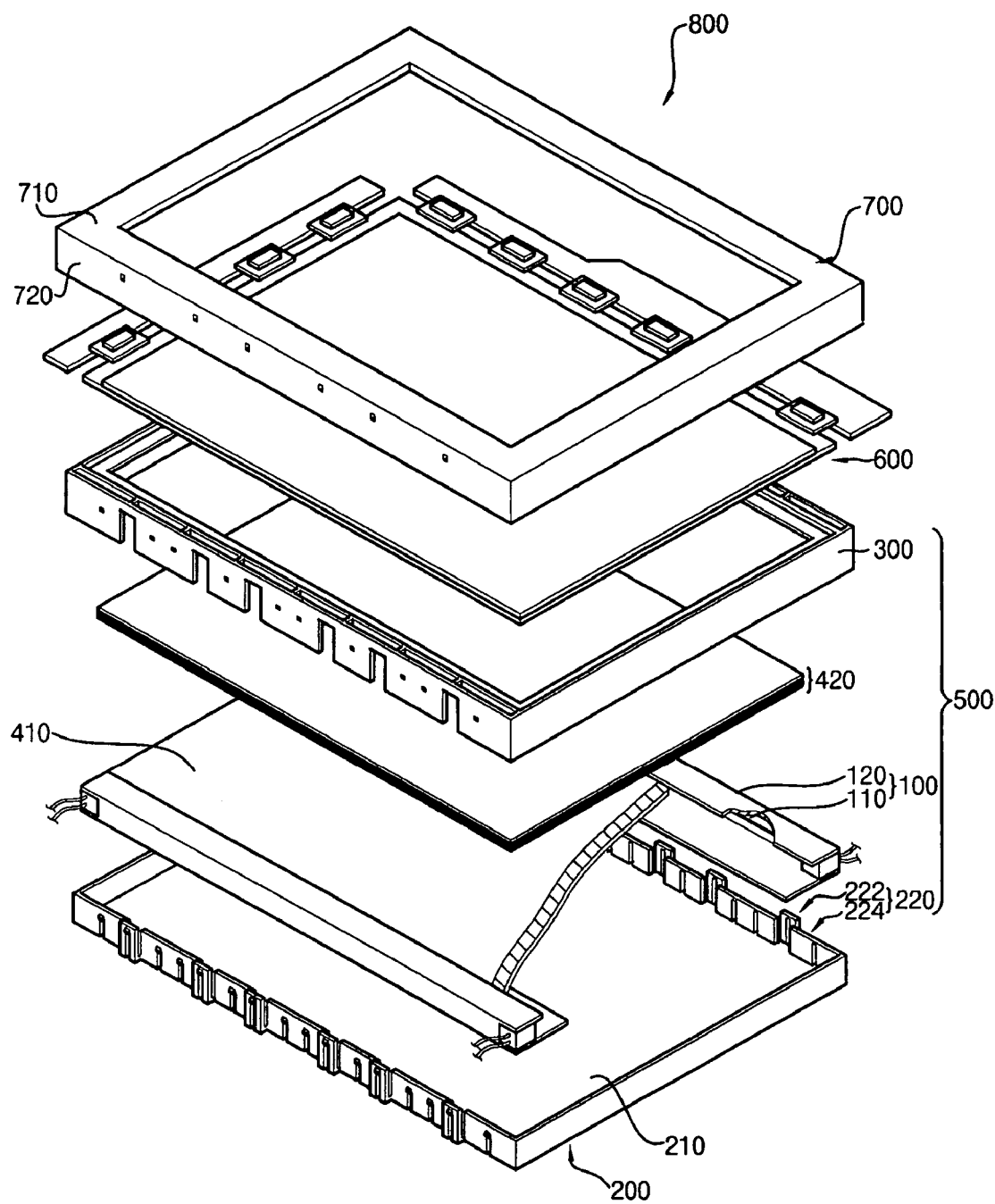
FIG. 12 is an exemplary exploded perspective view showing a display apparatus according the present invention.

FIG. 12 is an exploded perspective view showing a display apparatus according to an exemplary embodiment of the present invention.

Referring to FIG. 12, a display apparatus 800 includes the backlight assembly 500, a display panel 600 and a chassis 700.

The backlight assembly 500 includes the lamp assembly 100, the receiving container 200 and the panel guide member 300. The backlight assembly 500 may further include the light guide plate 410 and the optical member 420.

In order to display images on the display panel 600, the lamp assembly 100 generates the light. The lamp assembly 100 includes the lamp 110 and the lamp cover 120.

The lamp 110 includes the lamp body 112 and the pair of electrodes (not shown). In the present embodiment, the lamp 110 may include the cold cathode fluorescent lamp CCFL.

The lamp body 112 may have various shapes, for example, such as a general bar-shape, a general U-shape, a general C-shape and so on. The lamp body 112 includes the discharge gas (not shown) injected thereinto and the fluorescent layer (not shown) formed therein. In the present embodiment, the discharge gas may include mercury (Hg), argon (Ar), neon (Ne), xenon (Xe), krypton (Kr) or the like, and the fluorescent layer is formed on the inner face of the lamp body 112.

The electrodes may be formed either inside or outside the lamp body 112. Each of the electrodes receives a different discharge voltage generated from a power supply through an inverter to one another. The discharge voltage applied to the electrodes has a sufficient difference in voltage levels to facilitate electron discharge.

The discharge gas injected into the lamp body 112 interacts with the discharged electron, to generate ultraviolet lighting the lamp body 112. The ultraviolet light is converted into the visible light due to the interaction of the ultraviolet light with the fluorescent layer.

The lamp cover 120 reflects the visible light to improve the efficiency of the visible light.

The lamp cover 120 includes the first light reflecting face 122, the second light reflecting face 124 and the third light reflecting face 126 (referring to FIG. 10).

In the present embodiment, the first, second and third reflecting faces 120, 122 and 124 have a rectangular plate-like shape. The first reflecting face 122 faces the second reflecting face 124, and the third reflecting face 126 connects the first reflecting face 122 and the second reflecting face 124.

The lamp holder 128 is placed inside the lamp cover 120, and the lamp 110 is fixed to the lamp cover 120 by means of the lamp holder 128.

The visible light from the lamp 110 is reflected from the first, second and third light reflecting faces 122, 124 and 126.

The light guide plate 410 is combined with the lamp cover 120. The light guide plate 410 enhances the uniformity of brightness of the visible light from the lamp assembly 100. The light guide plate 410 has a plate-like shape such as a general rectangular parallelopiped shape. The light guide plate 410 includes the light reflecting face 415, the light exiting face 416 facing the light reflecting face 415, and the four side faces 411, 412, 413 and 414 connecting the light reflecting face 415 and the light exiting face 416 (referring to FIG. 4).

Particularly, the side faces 412 and 414 are defined as the first side faces having a first area, respectively, and the side faces 411 and 413 are defined as the second side faces having a second area that is smaller than the first area, respectively. The first side faces 412 and 414 face each other, and the second side faces 411 and 413 also face each other.

The lamp assembly 100 is disposed adjacent to at least one of the first side faces, and the visible light from the lamp assembly 100 is incident into the light guide plate 410 through the first side faces. The incident visible light exits the light guide plate 410 through the light exiting face 416.

The receiving container 200 includes the bottom 210 and the sidewall 220 to provide the receiving space.

The lamp assembly 100 and the light guide plate 410 are disposed on the bottom 210 of the receiving container 200. The light guide plate 410 is disposed at a center portion of the bottom 210 of the receiving container 200, and the lamp assembly 100 is disposed between the light guide plate 410 and the sidewall 220 of the receiving container 200. Thus, the outer surface of the third light reflecting face 126 of the lamp cover 120 faces the sidewall 220 of the receiving container 200.

Figure 13:
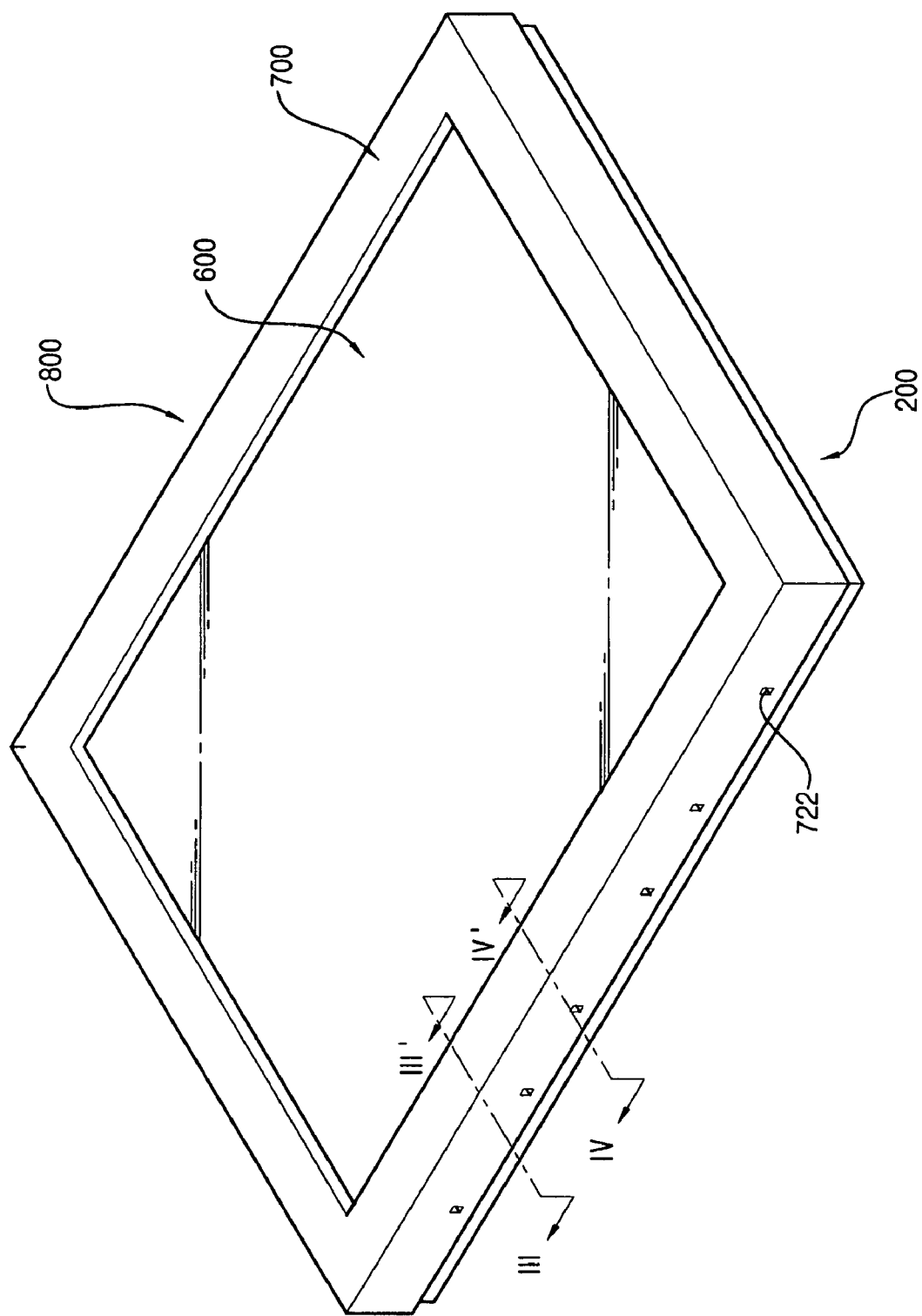
FIG. 13 is an exemplary assembled perspective view of the display apparatus in FIG. 12.
Figure 14:
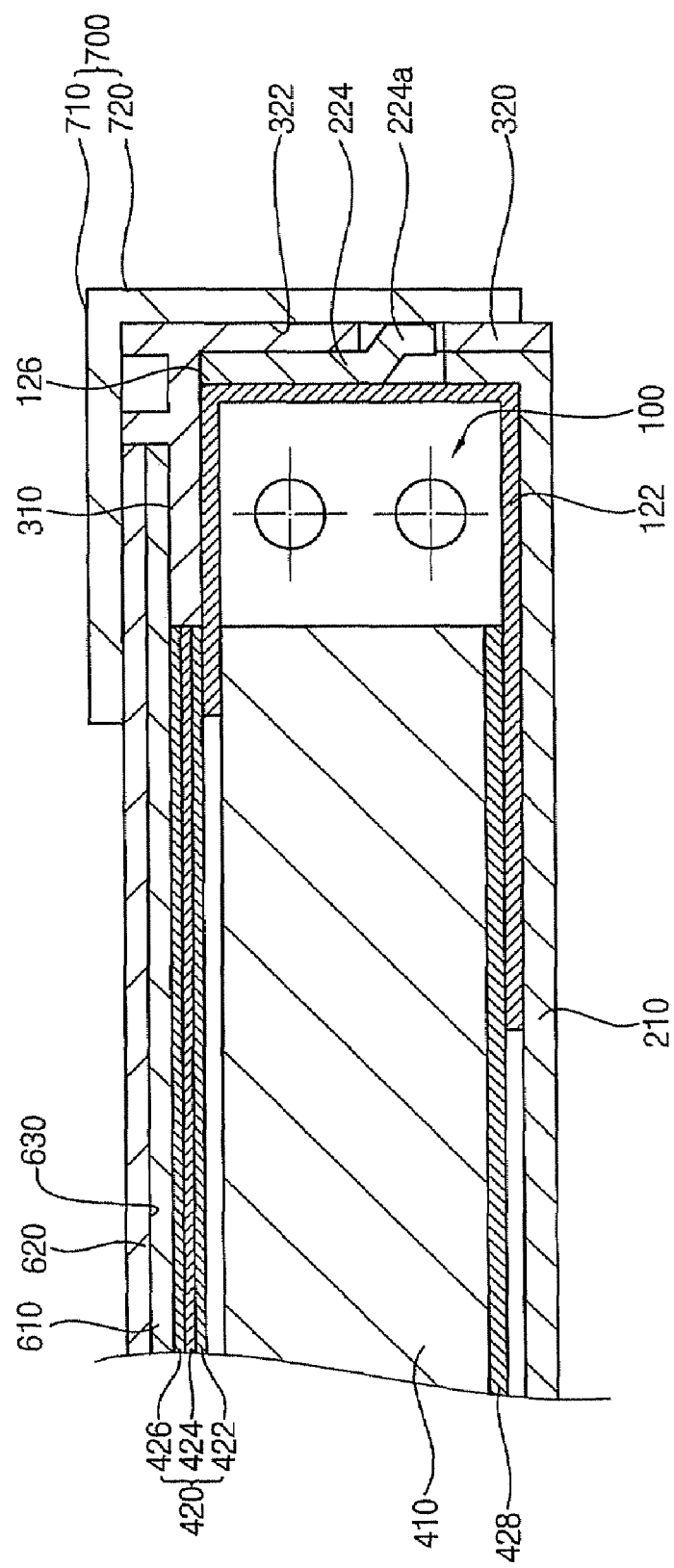
FIG. 14 is an exemplary cross-sectional view taken along line III-III' showing the display apparatus in FIG. 13.
Figure 15:
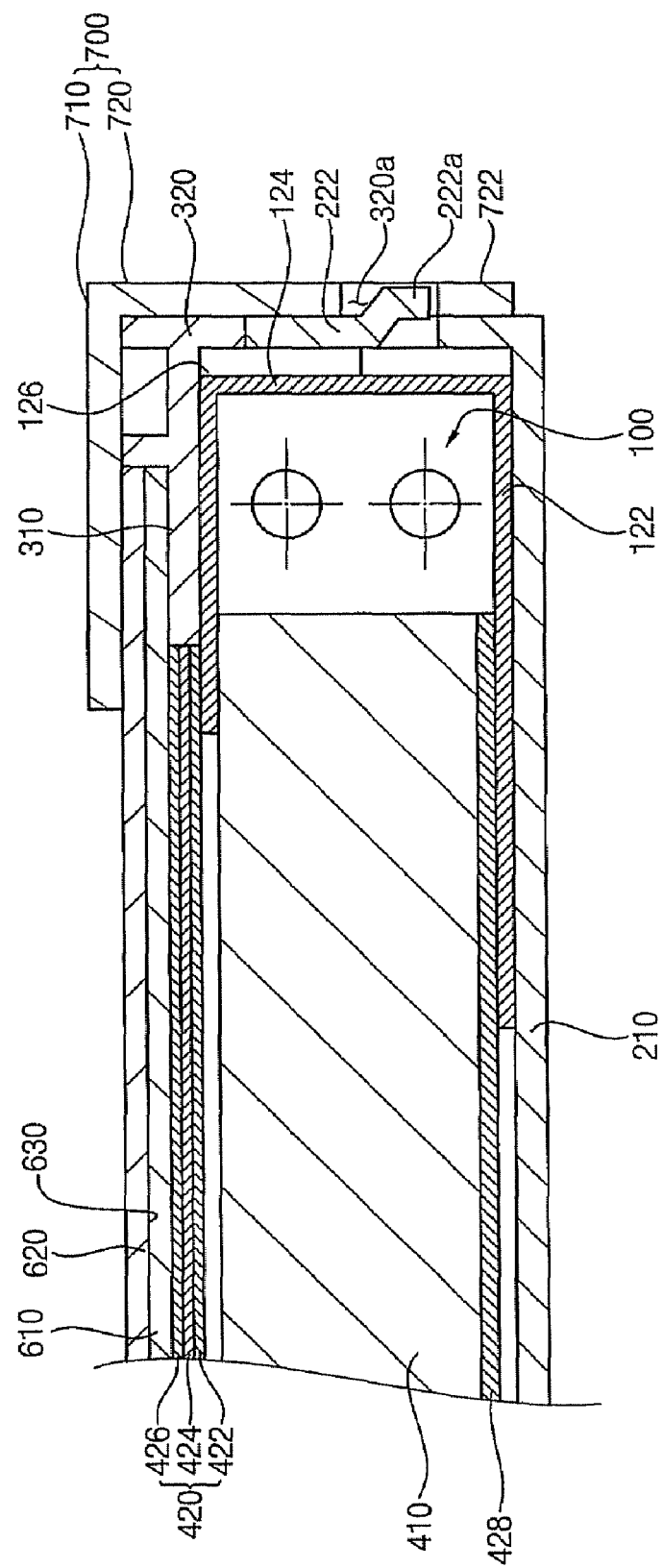
FIG. 15 is an exemplary cross-sectional view taken along line IV-IV' showing the display apparatus in FIG. 13.

FIG. 13 is an assembled perspective view of the display apparatus in FIG. 12. FIG. 14 is a cross-sectional view taken along line III-III' showing the display apparatus in FIG. 13. FIG. 15 is a cross-sectional view taken along line IV-IV' showing the display apparatus in FIG. 13.

Referring to FIGS. 13 to 15, the sidewall 220 of the receiving container 200 is extended from the bottom 210 in a direction substantially perpendicular to the bottom 210.

The sidewall 220 includes the first sidewall 222 and the second sidewall 224.

The receiving container 200 includes at least two first sidewalls 222 formed at a periphery of the bottom 210. The first sidewall 222 is separated from the third light reflecting face 124 by the predetermined first distance. In the present embodiment, the first sidewall 222 includes the first catching protrusion 222a that partially protrudes from the first sidewall 22. Also, the receiving container 200 may include at least two second sidewalls 224. The second sidewalls 224 are disposed between the first sidewalls 222, and are substantially parallel to the first sidewall 222. The second sidewalls 224 are separated from the third light reflecting face 124 of the lamp cover 100 by the predetermined second distance. The second sidewalls 224 may include the second catching protrusion 224a that partially protrudes from the second sidewalls 224. The second sidewalls 224 have the second height that is less than the first height of the first sidewall 222.

In the present embodiment, the interval G between the first and second sidewalls 222 and 224 is in a range from about 0.6 mm to about 5 mm in the direction substantially perpendicular to a longitudinal direction of the lamp cover 100. The interval G between the first and second sidewalls 222 and 224 is substantially equal to the thickness of the second frame portion of the panel guiding member 300 (referring to FIG. 12).

The panel guiding member 300 is coupled to the receiving container 200. The panel guiding member 300 secures the display panel to the receiving container 200.

The panel guide member 300 includes the first frame portion 310 and the second frame portion 320.

The first frame portion 310 has a plat-like shape and faces the bottom 210 of the receiving container 200. The first frame portion 310 supports the display panel.

The second frame portion 320 also has the plate-like shape and is integrally formed with the first frame portion 310. The second frame portion 320 is extended in a direction that is substantially perpendicular to the direction that the first frame portion 310 is extended in. Thus, the second frame portion 320 is substantially parallel to the first and second sidewalls 222 and 224.

The second frame portion 320 is coupled to the second sidewall 224. In order to couple the second frame portion 320 to the second sidewall 224, the second frame portion 320 includes the catching recess 320a that corresponds to the second catching protrusion 224a. The catching recess 320a may be formed through the second frame portion 320, or the catching recess 320a may be the protrusion in case that the second sidewall 224 includes the catching recess 320a in lieu of the second catching protrusion 224a.

The second frame portion 320 overlaps with the first sidewall 222 and has a thickness that is greater than that of the first sidewall 222. The second frame portion 320 is partially removed to form the opening 322 through which the first sidewall 222 is partially exposed. In order to allow a portion of the first sidewall 222 to make contact with the second frame portion 320, the second frame portion 320 includes the stepped portion formed therearound. Thus, the second frame 320 and the first sidewall 222 are formed on the substantially same level.

The backlight assembly 500 (referring to FIG. 12) may further include the optical member 420. The optical member 420 may include the diffusing sheet 422, the prism sheet 424, the brightness enhancing film 426 and the reflecting plate 428.

The diffusing sheet 422 improves the uniformity of brightness of the light from the light exiting face 416 and enhances an angle between the light from the light guide plate 410 and the light reflecting face 415.

The prism sheet 424 is disposed on the diffusing sheet 422. The prism sheet 424 includes a prism pattern to collect the light diffused by the diffusing sheet 422. The prism sheet 424 changes the path of the light from the diffusing sheet 422 in the direction substantially perpendicular to the light reflecting face 415. In the present embodiment, at least two prism sheets 424 are disposed on the diffusing sheet 422, and the prism sheets 424 have the prism pattern substantially perpendicular to each other.

The brightness enhancing film 426 is disposed on the prism sheet 424 to enhance the brightness of the light incident into the display panel.

The reflecting plate 426 is disposed between the bottom 200 of the receiving container 200 and the light reflecting face 415 of the light guide plate 410 to reflect the light leaked through the light reflecting face 415 to the light guide plate 410.

The display panel 600 is disposed on the first frame portion 310 of the panel guiding member 300. The display panel 600 includes a thin film transistor substrate 610, a color filter substrate 620 and a liquid crystal layer 630.

The thin film transistor substrate 610 includes a plurality of pixel electrodes, a plurality of thin film transistors electrically connected to the pixel electrodes and a plurality of signal lines to drive the thin film transistor.

The pixel electrodes are formed on the thin film transistor substrate 610 in a matrix configuration, the thin film transistors are electrically connected to the pixel electrodes through a drain electrode thereof, respectively.

The signal lines include first signal lines connected to gate electrodes of the thin film transistors, respectively, and second lines connected to source electrodes of the thin film transistors, respectively.

The color filter substrate 620 includes a common electrode facing the pixel electrodes and color filters corresponding to the pixel electrodes, respectively.

The liquid crystal layer 630 is disposed between the thin film transistor 610 and the color filter substrate 620.

The chassis 700 includes a first chassis portion 710 and a second chassis portion 720 to prevent separation of the display panel 600 from the display panel guiding member 300.

The first chassis portion 710 has a plate-like shape and is formed along an end of the display panel 600. The first chassis portion 710 covers the end of the display panel 600, thereby preventing the separation of the display panel 600 from the display panel guiding member.

The second chassis portion 720 is extended from the first chassis 710 along the second frame portion 320 of the display panel guide member 300. The second chassis 720 is coupled to the second sidewall 224 via the catching recess 320*a*.

The second chassis 720 includes an engaging portion 722 formed at the first sidewall 222 corresponding to the catching protrusion 222*a*. The first catching protrusion 222*a* is coupled with the engaging portion 722, thereby securing the chassis 700 to the receiving container 200.

As described above, by introducing an overlap between the sidewall of the backlight assembly with the display panel guiding member during the assembling of the backlight assembly, the size of the non-effective display area can be reduced.

Although the exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:

1. A backlight assembly comprising:
   a lamp assembly comprising:
      a light source to generate light; and
      a lamp cover to reflect the light,
   a receiving container comprising:
      a bottom on which the lamp cover is disposed; and
      a sidewall having a first sidewall portion facing the lamp cover and being separated from the lamp cover by a first interval, and a second sidewall portion that is adjacent to the first sidewall portion and is separated from the lamp cover by a second interval, wherein the second interval is narrower than the first interval, and a thickness of the first sidewall portion is substantially same as that of the second sidewall portion,
   a panel guiding frame comprising:
      a first frame portion disposed on an upper face of the sidewall and facing an end of the bottom; and
      a second frame portion extended from the first frame portion along a side face of the second sidewall portion and having an opening corresponding to the first sidewall portion.

2. The backlight assembly of claim 1, wherein the first sidewall portion and the second sidewall portion are alternately disposed at the end of the bottom.

3. The backlight assembly of claim 1, wherein the first sidewall portion and the second sidewall portion are disposed at the ends of the bottom such that the first sidewall portion and the second sidewall portion are substantially parallel to each other.

4. The backlight assembly of claim 1, wherein the first sidewall portion has a first height from the bottom and the second sidewall portion has a second height from the bottom that is less than the first height from the bottom.

5. The backlight assembly of claim 1, wherein an interval between the first and second sidewall portions is in a range from about 0.6 mm to about 5 mm in a direction substantially perpendicular to a longitudinal direction of the lamp cover.

6. The backlight assembly of claim 1, wherein the lamp cover comprises:
   a first light reflecting face facing the bottom;
   a second light reflecting face facing the first light reflecting face; and
   a third light reflecting face adjacent to the second sidewall portion so as to connect the first light reflecting face and the second light reflecting face.

7. The backlight assembly of claim 1, wherein the first sidewall portion comprises a catching protrusion that protrudes therefrom.

8. The backlight assembly of claim 1, wherein a surface of the first sidewall portion and a surface of the second sidewall portion are at substantially the same level as each other.

9. The backlight assembly of claim 8, wherein the second frame portion has a thickness that is greater than the first sidewall portion, and a stepped-portion formed in association with an opening so as to support the first sidewall portion.

10. The backlight assembly of claim 1, wherein the second sidewall portion comprises a first coupling portion and the second frame portion comprises a second coupling portion coupled to the first coupling portion.

11. The backlight assembly of claim 10, wherein the first coupling portion is a recess and the second coupling portion is a protrusion.

12. The backlight assembly of claim 10, wherein the first coupling portion is a protrusion and the second coupling portion is a recess.

13. A backlight assembly comprising:
   a lamp assembly comprising:
      a light source to generate light; and
      a lamp cover to reflect the light,
   a receiving container comprising:
      a bottom to support the lamp cover; and
      a sidewall having first sidewall portions formed at a periphery of the bottom, and second sidewall portions formed at areas corresponding between the first sidewall portions, the first sidewall portions being misaligned with the second sidewall portions, a thickness of the first sidewall portion being substantially same as that of the second sidewall portion,
   a panel guiding frame comprising:
      a first frame portion facing a periphery of the bottom; and
      a second frame portion extended from the first frame portion along the sidewall and having an opening corresponding to the first sidewall portions.

14. The backlight assembly of claim 13, wherein the first sidewall portions are substantially parallel to the second sidewall portions.

15. The backlight assembly of claim 13, wherein the second sidewall portion comprises a first coupling portion and the second frame portion comprises a second coupling portion coupled to the first coupling portion.

16. The backlight assembly of claim 15, wherein the first coupling portion is a recess and the second coupling portion is a protrusion.

17. The backlight assembly of claim 15, wherein the first coupling portion is a protrusion and the second coupling portion is a recess.

18. A backlight assembly comprising:
a lamp assembly comprising:
a light source to generate light; and
a lamp cover to reflect the light,
a receiving container comprising:
a bottom to support the lamp cover; and
a sidewall having a first sidewall portion partially formed at a periphery of the bottom and separated from the lamp cover by a first interval, and a second sidewall portion formed at the periphery of the bottom and separated from the lamp cover by a second interval narrower than the first interval,
wherein an interval between the first and second sidewall portions is in a range from about 0.6 mm to about 5 mm in a direction substantially perpendicular to a longitudinal direction of the lamp cover, and
a thickness of the first sidewall portion is substantially same as that of the second sidewall portion.

19. The backlight assembly of claim 18, wherein the first sidewall portions are substantially parallel to the second sidewall portions.

20. The backlight assembly of claim 18, wherein the second sidewall portion comprises a first coupling portion and a second coupling portion coupled to the first coupling portion.

21. The backlight assembly of claim 20, wherein the first coupling portion is a recess and the second coupling portion is a protrusion.

22. The backlight assembly of claim 20, wherein the first coupling portion is a protrusion and the second coupling portion is a recess.

23. A display apparatus comprising:
a lamp assembly comprising:
a light source to generate light; and
a lamp cover to reflect the light,
a receiving container comprising:
a bottom to support the lamp cover; and
a sidewall having first sidewall portions formed at a periphery of the bottom to guide the lamp cover, and second sidewall portions formed at areas corresponding between the first sidewall portions and deviated from an imaginary straight line connecting the first sidewall portions, a thickness of the first sidewall portion being substantially same as that of the second sidewall portion,
a panel guiding frame comprising:
a first frame portion facing the periphery of the bottom; and
a second frame portion extended from the first frame portion along the sidewall and having a first opening corresponding to the first sidewall portions,
a display panel disposed on the first frame portion to display an image using the light; and
a chassis to secure the display panel to the receiving container.

24. The display apparatus of claim 23, wherein the first sidewall portion and the second sidewall portion are alternately disposed at the end of the bottom.

25. The display apparatus of claim 23, wherein the first sidewall portions are substantially parallel to the second sidewall portions.

26. The display apparatus of claim 23, wherein the first sidewall portions have a first height from the bottom and the second sidewall portions have a second height from the bottom that is lower than the first height from the bottom.

27. The display apparatus of claim 23, wherein an interval between the first and second sidewall portions is in a range from about 0.6 mm to about 5 mm in a direction that is substantially perpendicular to a longitudinal direction of the lamp cover.

28. The display apparatus of claim 23, wherein the second sidewall portions comprise a first coupling portion and the second frame portion comprises a second coupling portion that is coupled to the first coupling portion.

29. The display apparatus of claim 28, wherein the first coupling portion is a recess and the second coupling portion is a protrusion.

30. The display apparatus of claim 28, wherein the first coupling portion is a protrusion and the second coupling portion is a recess.

31. The display apparatus of claim 23, wherein the chassis comprises:
a first chassis portion disposed at an end of the display panel; and
a second chassis portion extended from the first chassis along the sidewall.

* * * * *